United States
Slocum

[11] 3,969,545
[45] July 13, 1976

[54] LIGHT POLARIZING MATERIAL METHOD AND APPARATUS

[75] Inventor: Robert E. Slocum, Richardson, Tex.

[73] Assignee: Texas Instruments Incorporated, Dallas, Tex.

[22] Filed: Nov. 19, 1974

[21] Appl. No.: 525,232

Related U.S. Application Data

[63] Continuation-in-part of Ser. No. 337,046, March 1, 1973, abandoned.

[52] U.S. Cl. .............................. 427/163; 427/166; 427/250; 427/251; 350/147
[51] Int. Cl.² ..................................... C23C 13/02
[58] Field of Search ........... 427/163, 166, 250, 251; 264/2; 350/147

[56] References Cited
UNITED STATES PATENTS

| | | | |
|---|---|---|---|
| 3,046,839 | 7/1962 | Bird et al. | 117/107 X |
| 3,063,866 | 11/1962 | Mayer et al. | 117/107 X |
| 3,147,085 | 9/1964 | Gatti | 117/107.1 X |
| 3,353,895 | 11/1967 | Emerson | 117/107 X |
| 3,505,092 | 4/1970 | Ryan et al. | 117/107 X |
| 3,514,320 | 5/1970 | Vaughan | 117/107 X |
| 3,668,062 | 6/1972 | Shyne et al. | 117/106 R X |

*Primary Examiner*—Harris A. Pitlick
*Attorney, Agent, or Firm*—Harold Levine; Rene E. Grossman; Alva H. Bandy

[57] ABSTRACT

A method of making a light polarizing material having excellent polarization characteristics over wavelengths from the visible to the infrared (IR) region is disclosed. A smooth surface of an optical material, such as for example glass, plastic or IR transmitting material, is mounted in a vacuum enclosure and a vaporized material or metal is directed onto the surface. The metal may be gold, silver, copper or aluminum, for example, or any other material or combination thereof which is reflective at the wavelength to be polarized. As the deposition occurs on the surface, metal atoms are initially attached to sites on the surface with metal whiskers forming on the initial sites in the direction of the incident vaporized metal. The metal whiskers are grown with their long axis essentially parallel to the vaporized metal direction and essentially parallel to each other. Uniformity of the coating formed by the metal whiskers can be improved by subjecting the coated transparent surface to a second vaporized metal which produces second metal whiskers with their long axis essentially parallel to the second vaporized metal direction and the projections of said first and second metal whiskers onto the surface are essentially parallel to each other. The resulting polarizer material can be produced in sheet form or applied as a coating to optical elements.

17 Claims, 7 Drawing Figures

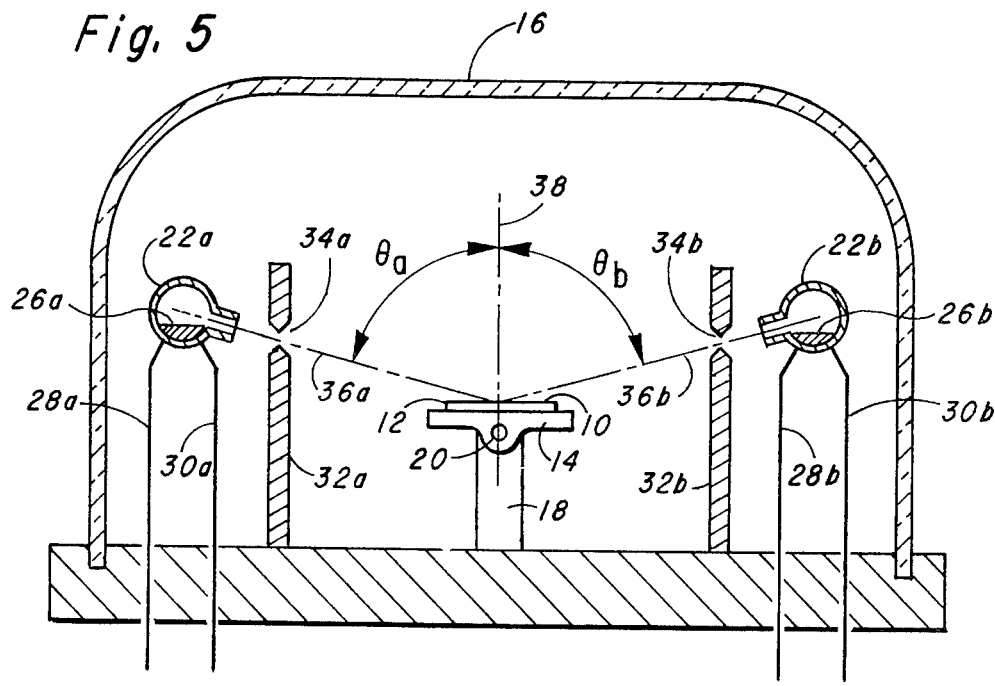
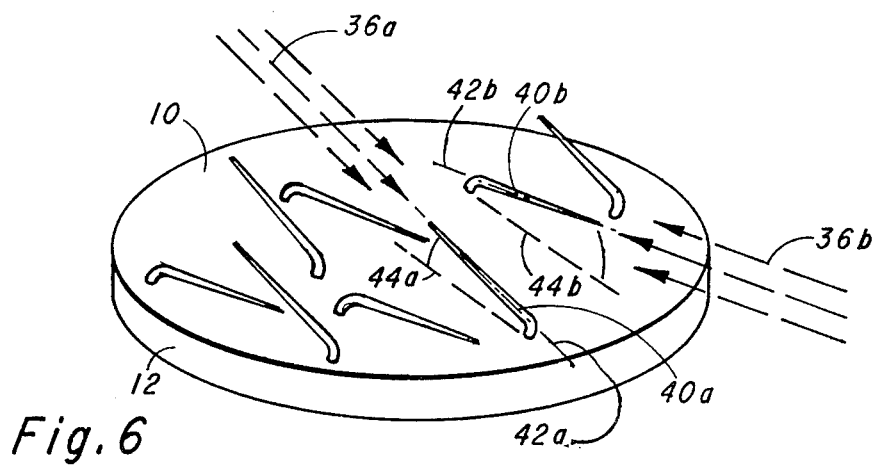

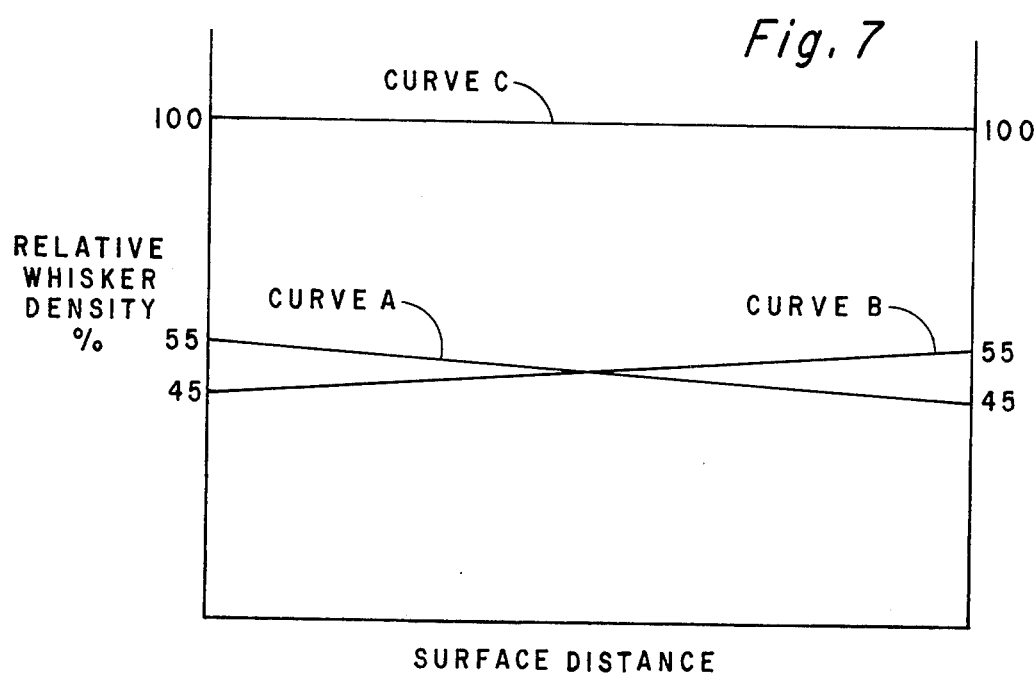
Fig. 7
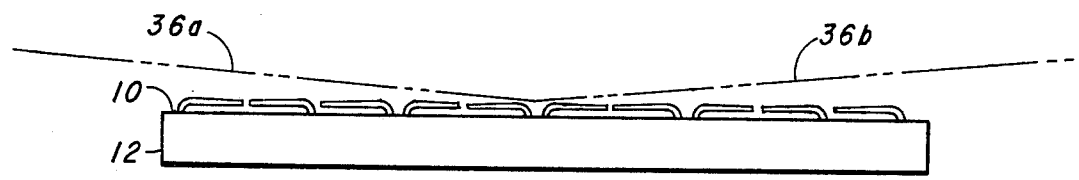

LIGHT POLARIZING MATERIAL METHOD AND APPARATUS

This is a continuation in part of application Ser. No. 337,046, filed Mar. 1, 1973 and now abandoned.

This invention relates to light polarizers and more particularly to a method for producing light polarizing material and the resulting product thereof.

Light polarizers are conveniently classified as either prism, reflectance or sheet polarizers. Although prism and reflectance polarizers are extremely effective, their use is restricted by the fact that they are bulky and often have small areas and limited angular aperture. The advantages of sheet polarizers have been well established with the introduction of Polarioid sheet film polarizers. The Polaroid process consists of orienting microscopic dichroic crystals in a film and is described in the *Journal of the Optical Society of America*, Vol. 41, page 957, 1951. This type polarizer has good performance in the visual spectral region and a type HR Polaroid can be used for the near infrared. The disadvantage of this approach in general is that it requires a film and cannot be directly applied to the surface of an optical element. Further, since it is a chemical polarizer, the temperature stability is determined by the dichroic chemical and film stability. In particular, it has been determined that the HR Polaroid deteriorates rapidly at temperatures above 55°C. Because of the transmission of the material, the useful wavelength of the HR Polaroid is from 0.8 to 2.2 microns and no Polaroid is available for longer wavelengths.

A second approach for producing sheet polarizers is the wire-grid approach such as is disclosed in *Journal of the Optical Society of America*, Vol. 50, page 72, 1960. The principle first used by Hertz to polarize radio waves is based on the use of wires with length greater and diameter and spacing smaller than the wavelength of the radiation to be polarized. When the electric vector of light is parallel to the wire direction, it is reflected and when it is perpendicular it is transmitted. U.S. Pat. No. 3,046,839 to Bird et al describes a transparent diffraction grating with a sawtooth cross section with deposited gold on the tips of the sawteeth to form regular, continuous parallel strips of gold. These wire grids are effective polarizers in the infrared.

A number of problems are associated with prior art wire grid approaches. First the infrared region where the grid spacing is close enough to provide good polarization requires substrates which are transparent and can be impressed with a grid pattern prior to metal grid deposition. These materials are soft plastics which have unwanted absorption bands or other materials which cold flow and deteriorate with temperature. As the wavelengths approach the visible spectrum, the required grid spacing is so small that it is impractical to deposit metal at the required spacing as evidenced by degraded performance at shorter wavelengths.

An alternate approach is to actually scribe the grid pattern onto an IR transmitting surface by means of a ruling engine such as is described by the article in *Applied Optics* by J. B. Young et al., Vol. 4, page 1023, 1965. However, the tedious step of ruling each polarizing filter obviously precludes production of large quantities of polarizers.

A coating approach to sheet polarizer production is to apply a polarizing solution coating to an oriented surface and allow it to dry such as is disclosed in the *Journal of the Optical Society of America*, Vol. 37, page 983, 1947. These coatings can be applied to rubbed surfaces of glass or plastic; however, these devices can only operate from the ultraviolet region of the spectrum out to 7000 Angstroms.

Accordingly it is an object of the present invention to provide a polarizer which has excellent degree of polarization over a wide range of wavelengths from the visible to the infrared regions.

Another object of the present invention is to provide a light polarizing material which can be formed by appling a thin film coating composed of whiskers which may be metallic to any smooth, transparent surface.

Another object of the present invention is to provide a polarizing coating which polarizes both the light reflected as well as the light transmitted by said coating.

Another object of the present invention is to provide a polarizer which can be fabricated in sheet form or applied as a film to optical elements.

A further object of the present invention is to provide a polarizer which has greater temperature stability and wider spectral band as well as comparable dichroic characteristics than conventional polarizers.

Another object of the present invention is to provide a method of fabrication polarizing material which has a uniform coating density thereon.

A still further object of the present invention is to provide a method which allows production of polarizers, which method can be performed relatively rapidly and inexpensively and which can be controlled for consistent quality thereby lending itself to arge production quantities.

Other objects and features of the invention will become more readily understood from the following detailed description and appended claims when read in conjunction with the accompanying drawings; in which:

FIG. 5 illustrates an alternative schematic side view, with elements partly in cross section, illustrating a method of obtaining more uniform coatings on a surface according to the present invention.

FIG. 6 illustrates a magnified view of the resulting polarizing material showing the relative orientation of the metal whiskers.

FIG. 7 is a graph illustrating the whisker density versus the surface distance resulting from the process shown in FIG. 5.

Figure 1:
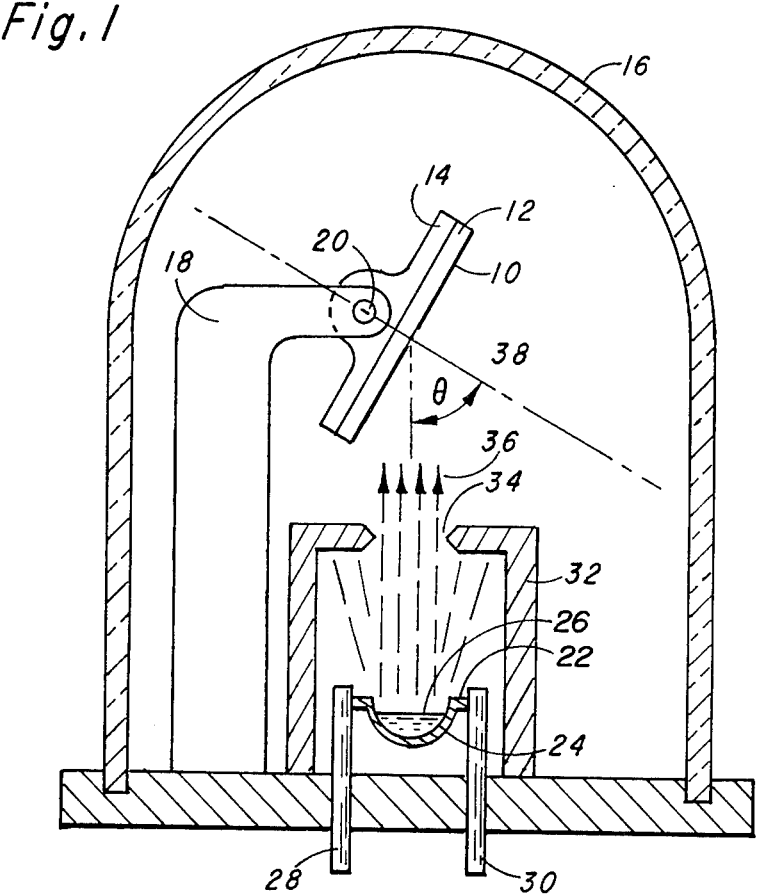
FIG. 1 is a schematic side view, with elements partly in cross section, illustrating the step of directing a vaporized metal upon a surface forming a part of the process of the present invention.

Referring now to FIG. 1, one method of forming a light polarizing material according to the present invention is illustrated. A substrate 12 having a microscopically smooth surface 10 is mounted on substrate holder 14 in bell jar 16. The smooth surface is required to eliminate shadowing effects which cause gaps in the surface of the deposited whiskers. Prior to mounting the substrate 12 in bell jar 16, the surface 10 of substrate 12 is cleaned and/or coated. The substrate 12 may be made of, for example, a glass or plastic which is transparent to visible light or an IR transmitting material, such as germanium or mercury cadmium telluride compound which is transparent to IR light and may be an optical element such as a lens, mirror or beam splitter. The substrate 12 is mounted to substrate holder 14 by any suitable means, such as screws or adhesive. Substrate holder 14 is attached to support 18 through pin 20 which allows the substrate holder 14 and substrate 12 to pivot or rotate relative to support 18. Heater element 22 has a receptacle means 24 for retaining the material, or in the preferred embodiment, the metal 26 to be vaporized. The heater element 22 is connected to heater electrodes 28 and 30 which are in turn connected to a source of power (not shown). Between the metal source 26 and the surface 10 is a collimating apparatus 32 having a collimating slit or aperture 34.

In operation, the process according to the preferred embodiment of the present invention includes first cleaning a 1 inch by 1 inch square surface 10 of, for example, a glass substrate 12 and mounting it at room temperature (24°C) on substrate holder 14 positioned about 50 cms from a metal source. A suitable high-vacuum of about $2 \times 10^{-5}$ Torr is provided within the enclosure of bell jar 16 utilizing known techniques. Next the metal source 26 which may be, for example, 0.065 troy ounces of silver, gold, copper, or aluminum is heated to its evaporating temperature by passing a current through heater electrodes 28 and 30 thereby producing a vaporized metal stream which is permitted to pass through collimating slit 34 to the surface 10 of substrate 12 for about ten minutes. Collimating slit 34 forms parallel streams of vaporized metal which impinge directly on surface 10 at an angle of incidence $\theta$ with respect to the axis 38 normal to the surface 10. This angle of incidence, $\theta$, is normally between 80° and 90° with best results at about 88° with respect to axis 38 in order for the vaporized metal 36 to adequately cover surface 10. It will be understood by those skilled in the art that the source 26 may be any other metal or material which is reflective at the wavelength to be polarized.

Figure 2:
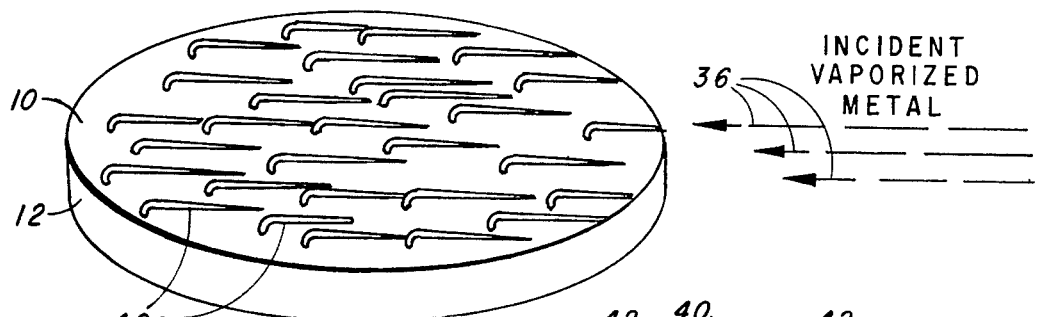
FIG. 2 is a magnified view of the resulting metal whiskers formed on the surface of the material resulting from the process illustrated in FIG. 1.
Figure 2A:
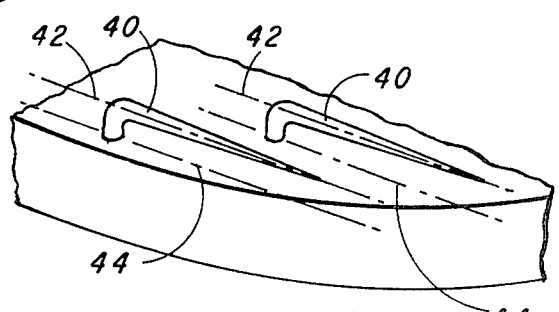

As the metal source 26 evaporates in the vacuum enclosure 16, the vaporized metal 36 impinges on surface 10 thereby initially producing metal atoms attached to nucleation sites on the surface 10. For further information of nucleation site see the article by Henry Levinsten, "The Growth and Structure of Thin Metal Films," *Journal of Applied Physics*, Vol. 20, April 1949, p. 311, and Chopra, Kasturi L., "Thin Film Phenomena" pp 177–178, McGraw-Hill Book Company, Inc., New York, 1969. As the vaporized metal 36 continues to impinge upon surface 10, a plurality of metal whiskers 40 (as shown in the magnified view illustrated in FIG. 2) are grown on the metal atoms at the nucleation sites of the smooth, transparent surface 10 to form a discontinuous film thereof. The term "whisker" as employed herein denotes an elongated projection attached or anchored at one end to the surface and unattached on the other end. As deposition continues, the metal whiskers 40 are grown on the initial sites in the direction of the incident vaporized metal 36 until a coating consisting of a uniform distribution of these metal whiskers 40 covers the exposed surface 10 of substrate 12. During the whisker growth process, metal whiskers 40 are grown on the surface with their long axis essentially parallel and in line with the vaporized metal direction 36 and the projection 44 of each long axis 42 of each metal whisker 40 onto surface 10 is parallel to one another. An alternative, it will be recognized that whiskers 40 can be formed on surface 10 from a dielectric, such as silicon monoxide, and subsequently rendered reflective at the wavelength of light to be polarized by chemical or evaporative techniques. In the preferred embodiment, the whiskers 40 are grown until its length is at least as long or longer than the wavelength of the light to be polarized and the diameter and separation from each other is small compared to the wavelength of the light to be polarized; with these characteristics, the metal coating acts as a linear polarizer for both reflected and transmitted light.

Figure 3:
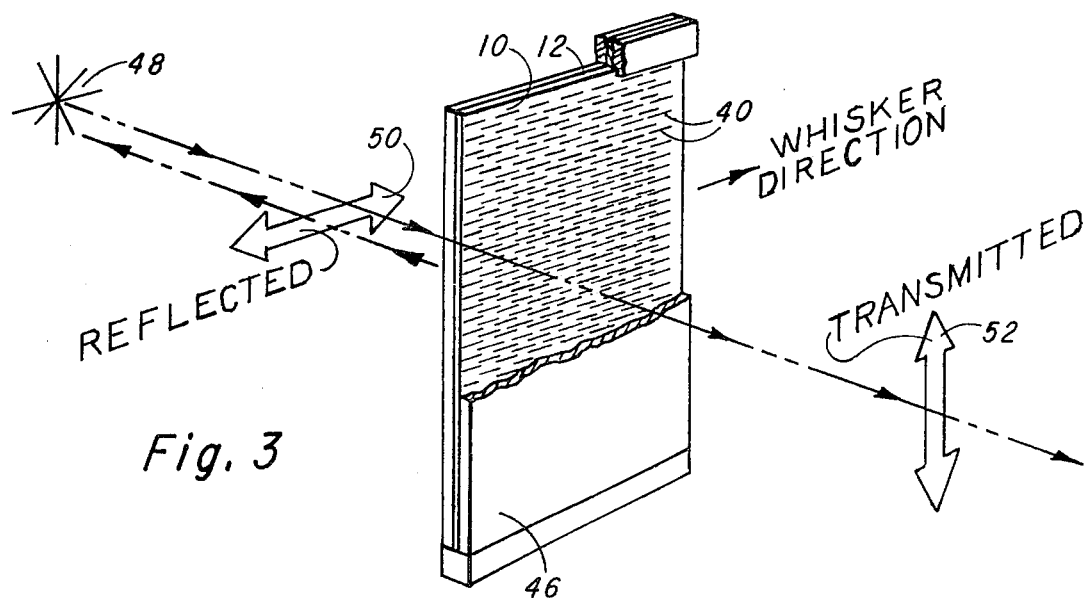
FIG. 3 illustrates the step of applying a protective coating to the resulting polarized material and the degree of polarization of light through the resulting polarizing material.

FIG. 3 illustrates such a polarizer constructed according to the present invention. A transparent optical coating 46, such as, for example, silicon monoxide (SiO), silicon dioxide, glass, plastics or magnesium flouride ($MgF_2$) may be applied to the metalized surface 10 for enhanced optical properties, thermal stabilization and physical protection of the surface 10. In use as a light polarizer, unpolarized light 48 incident on this polarizer from a near normal direction will have its reflected component parallel to the long axis of the metal whiskers 40 and the transmitted component 52 is perpendicular to the long axis of the whiskers 40. If substrate 12 is a light absorbing material, such as, for example, black glass, porcelain, and pigmented plastics, then a reflective light polarizer is produced in that the light impinging thereon is absorbed by the substrate 12 leaving only reflective component 50 present.

Figure 4:
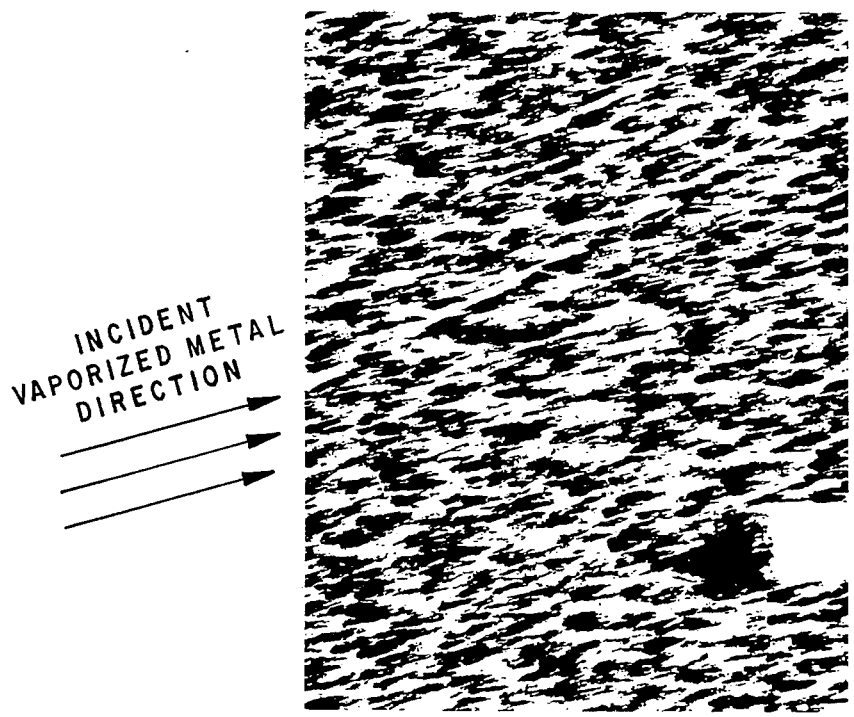
FIG. 4 is an electron microscope picture of a surface coated according to the present invention.

Light transmitted through a polarizer constructed according to the present invention was linearly polarized with a good degree of polarization. In an actual test, 0.065 troy ounce of gold was positioned 50 cms from the substrate and evaporated at a pressure of $2 \times 10^{-5}$ Torr for ten minutes through the collimated slit onto a polished transmparent 1 inch by 1 inch square optical glass blank with 96 percent transmission at a wavelength of 1.08 microns. A transmission electron microscope picture of the coating formed in this test according to the present invention is shown in FIG. 4 with the vaporized metal direction indicated. Magnification is 14,200×. Unpolarized light can be resolved into two perpendicular components with transmittances $k_1$ (transmitted) and $k_2$ (extinguished). For unpolarized light $k_1 = k_2 = 1.00$. Typical transmittance values for this polarizer evaluated at four wavelengths ranging from the visible to the near infrared are:

| Wavelength (microns, $\mu$m) | $k_1$ | $k_2$ |
|---|---|---|
| .5500 | .37 | .14 |
| 1.0830 | .77 | .04 |
| 1.3000 | .79 | .02 |
| 1.8900 | .73 | .02 |

Polarizers constructed according to the process described hereinabove have good surface coverage and uniform density. FIG. 5 illustrates a modified procedure for forming a polarized coating of the metals mentioned above on smooth, transparent surface 10 with a further improvement in uniform density across the face of the surface 10. The substrate 12 may be constructed of the above-mentioned substrate materials. The apparatus illustrated in FIG. 5 is similar to that illustrated in FIG. 1 except that there is a mirror image vapor metallizatin system included in bell jar 16. This enclosure 16 includes heater elements 22a–b connected to heater electrodes 28a–b and 30a–b. Metal sources 26a–b are included within heater elements 22a–b. Collimating apparatus 32a–b is intermediate the heater elements 22a–b and the surface 10 to to coated. Bell jar 16 is evacuated using standard techniques and heater electrodes 28a–b and 30a–b have current passed therethrough in order to heat metal sources 26a and 26b to produce vaporized metal streams 36a and 36b, respectively. Collimating slits 34a and 34b are so positioned such that the vaporized metal streams 36a and 36b impinge upon the surface 10 at substantially the same angle of incidence with respect to the axis 38 normal to surface 10; in other words, angle $\theta_a$ is substantially equal to angle $\theta_b$. As was the case with the embodiment shown in FIG. 1, $\theta_a$ and $\theta_b$ will be in the range, in the preferred embodiment, of 80° to 90°.

By first exposing the surface 10 to the vaporized metal stream 36a, metal whiskers 40a (see FIG. 6) will form on surface 10 in a manner as described with respect to FIG. 1. This process will continue until a whisker density defined by Curve A results on surface 10. It will be noted from FIG. 7 and Curve A in particular that the side of surface 10 which is closest to metal source 26a will have a higher density (for example 55 percent) than the side which is furthest away from metal source 26a (45 percent); as illustrated, there is approximately a 10 percent differential in whisker density across the surface 10 created by the metallic whisker coating formed by vaporized metal stream 36a.

By subjecting the surface 10 to a second vaporized metal stream 36b, which may or may not be the same metal as the first vaporized metal, at substantially the same angle of incidence as the vaporized metal stream 36a, second metal whiskers 40b (see FIG. 6) will form on surface 10 with their long axes 42b essentially parallel to the vaporized metal stream 36b and the projections 44a and 44b of the long axes 40a and 40b, respectively, onto surface 10 are essentially parallel to each other. Referring now to FIG. 7 again, it will be seen that the vaporized metal stream 36b produces a mirror image Curve B of the whisker density produced by the metal stream 36a. The total whisker density across surface 10 will be the summation of Curve A and Curve B which is represented by Curve C which is substantially uniform across the width of surface 10.

A modified procedure for obtaining the same results of a very uniform whisker density across surface 10 can be implemented by the apparatus illustrated in FIG. 1. Referring again to FIG. 1, after subjecting surface 10 to vaporized metal 36, such as, for example, silver, to produce the metallic whiskers 40 illustrated in FIG. 2, surface 10 can then be rotated 180° about the normal axis 38, and the surface 10 once again subjected to the vaporized metal stream 36 of silver or a different metal, such as gold, may be used to form the metal stream. This will produce a second group of metal whiskers identical to that illustrated in FIG. 6 and having the same whisker density characteristics shown in the Curves of FIG. 7.

Although the surface 10 has been illustrated as having finite width for purposes of convenience of illustration, it is understood that surface 10 can be in a continuous flexible form and successive portions of it can be moved into and out of the vaporized metal stream to form sheet-type polarizers. Of course, one of the primary advantages of the polarizing material produced according to the present invention is that it is no longer tied to a sheet or substrate whose optical properties limit the useful spectral range of the device. As previously mentioned, some prior art polarizers are limited by the spectral response of the plastic base and chemicals which form the matrix of dichroic molecules. In the case of wire grid polarizers, they are tied to materials which can be impressed with a grid. In the near infrared (8,000 to 35,000 Angstroms) the principal sheet polarizers are wire grid polarizers. Wire grid polarizers at present have degraded performance below 12,000 Angstroms. Over the near infrared, the polarizers produced according to the present invention have better performance than available wire grid polarizers and have, for example, both military and police applications in the near infrared night vision equipment.

Over the past ten years, a significant effort has been made to produce sheet infrared (3.5 to 20 microns) polarizers. Wire grid polarizers for this spectral range have been used but the substrate materials have in general been limited to transparent plastics and materials which cold flow; as a result, these polarizers have poor temperature characteristics and/or dead bands in their intended spectral regions. The polarizer constructed according to the present invention permits forming coatings on large area transparent materials such as Irtran (a pressed zinc sulfide), silicon, germanium or any smooth infrared transmitting material and provides a simple and inexpensive method when compared with the technique of scribing Irtran with grids.

In the visible spectral region, a thin coating polarizer can be produced using the method according to the present invention by utilizing a metal which reflects in the visible spectral region which would also make possible a single element which works from the near ultraviolet to the infrared provided a suitable transmitting substrate is utilized. In the visible spectral region the polarizer described herein can be used in sunglasses (and has the additional capability of allowing the coating to be directly applied to corrective eyeglass lenses), window glass (to reject heat, such as infrared radiation, and eliminate reflective glare in the view), in the automative industry (by polarizing the headlight beam and providing a polarizing filter for the drivers), and in liquid crystal displays which employ transmitting and/or reflective polarizing filters.

Although the present invention has been shown and illustrated in terms of a specific method and apparatus, it will be apparent that changes or modifications can be made without departing from the spirit and scope of the invention as defined by the appended claims.

What is claimed is:

1. The process of making light polarizers comprising directing in a vacuum a vaporized metallic material which is reflective at the wavelength to be polarized directly onto a microscopically smooth surface that whiskers formed of said material are grown on said surface with their long axis essentially parallel to the vaporized material direction and the projections of said long axis on said surface are essentially parallel.

2. The process of claim 1 wherein said surface is light transparent.

3. The process of claim 1 wherein said surface is opaque.

4. The process according to claim 1 including the step of collimating said vaporized material.

5. A process for producing an improved light polarizing material having polarization characteristics over wavelengths from the visible to the IR comprising the steps of mounting a microscopically smooth surface in a vacuum enclosure with a metal which can be vaporized, said surface being so mounted such as to form an angle of incidence of about 80° to 90° with respect to the metal beam from said metal, and evacuating said enclosure and heating said metal to produce a vaporized metal which impinges directly on said surface resulting in metal whiskers forming on said surface with their long axis essentially parallel to the vaporized metal direction and the projections of said long axis on said surface are essentially parallel.

6. A process according to claim 5 wherein said surface is transparent.

7. a process according to claim 5 wherein said surface is opaque.

8. A process according to claim 5 wherein said metal is a noble metal.

9. A process according to claim 5 wherein said surface is an IR transmitting material.

10. A process according to claim 5 wherein said surface is an optical element.

11. A process according to claim 5 wherein the length of metallic whiskers is at least as long as the wavelength of light to be polarized and the diameter and separation of the whiskers is less than one wavelength.

12. A process according to claim 5 further including the step of collimating said vaporized metal.

13. A process according to claim 5 wherein said surface is in a continuous flexible form and wherein successive portions thereof are moved into and out of said vaporized metal.

14. A process according to claim 5 including the step of applying an optical coating to the metallized surface for protectng the whiskered surface.

15. A process for producing a light polarizing material having uniform coating density thereon comprising the steps of directing in a vacuum a first vaporized metal directly onto a microscopically smooth surface such that the coating is grown composed of first metal whiskers each of which is attached at one end to said surface with its long axis essentially parallel to the first vaporized metal direction and the projections of said long axis on said surface are essentially parallel to each other.

16. A process according to claim 15 further including the steps of rotating said surface 180° about the normal axis to said surface and directing again said first vaporized metal directly onto said rotated surface to form second metal whiskers each of which is attached at one end to said surface with its long axis essentially parallel to the first vaporized metal direction and the projections of said first and second metal whiskers onto said surface are essentially parallel to each other.

17. A process according to claim 15 further including the step of directing in a vacuum a second vaporized metal at substantially the same angle of incidence as said first vaporized metal to form second metal whiskers attached at one end to said surface with their long axis essentially parallel to the second vaporized metal direction and the projection of said first and second metal whiskers onto said surface are essentially parallel to each other.

* * * * *